(12) United States Patent
Hamulski et al.

(10) Patent No.: US 6,974,514 B2
(45) Date of Patent: *Dec. 13, 2005

(54) METHOD FOR PRODUCING AN AIR-PERMEABLE LAMINATE FILM WITH A TEXTILE SURFACE, WHICH HAS ELASTIC AND NON-ELASTIC REGIONS

(75) Inventors: Markus Hamulski, Gronau (DE); Marcus Schönbeck, Versmold (DE); Georg Baldauf, Laer (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 358 days.

This patent is subject to a terminal disclaimer.

(21) Appl. No.: 10/366,281

(22) Filed: Feb. 13, 2003

(65) Prior Publication Data

US 2003/0173015 A1 Sep. 18, 2003

(30) Foreign Application Priority Data

Mar. 9, 2002 (DE) .............................. 102 10 415

(51) Int. Cl.$^7$ ......................... B32B 31/00; A61F 13/15
(52) U.S. Cl. .................... 156/73.1; 156/163; 156/164; 156/229; 156/308.4; 156/309.6
(58) Field of Search ............................. 156/161, 163, 156/164, 229, 73.1, 308.4, 290, 309.6; 442/328

(56) References Cited

U.S. PATENT DOCUMENTS

| | | |
|---|---|---|
| 4,726,976 A | 2/1988 | Karami et al. |
| 5,208,098 A | 5/1993 | Stover |
| 5,344,691 A | 9/1994 | Hanschen et al. |
| 5,376,430 A | 12/1994 | Swenson et al. |
| 5,422,172 A | 6/1995 | Wu |
| 5,514,470 A | 5/1996 | Haffner et al. |
| 5,554,246 A | 9/1996 | Anwyll, Jr. |
| 5,683,787 A | 11/1997 | Boich et al. |
| 5,769,993 A | 6/1998 | Baldauf |
| 5,789,065 A | 8/1998 | Haffner et al. |
| 5,851,935 A * | 12/1998 | Srinivasan et al. ......... 442/328 |
| 6,037,281 A | 3/2000 | Mathis et al. |
| 6,057,024 A * | 5/2000 | Mleziva et al. ............. 156/164 |
| 6,255,236 B1 * | 7/2001 | Cree et al. .................. 442/328 |
| 6,506,695 B2 | 1/2003 | Gardner et al. |
| 6,537,930 B1 * | 3/2003 | Middlesworth et al. ..... 442/328 |
| 6,677,258 B2 | 1/2004 | Carroll et al. |

(Continued)

FOREIGN PATENT DOCUMENTS

DE 42 38 541 5/1994

(Continued)

Primary Examiner—Jeff H. Aftergut
(74) Attorney, Agent, or Firm—Collard & Roe, P.C.

(57) ABSTRACT

A method is disclosed for the production of an air-permeable laminate film with a textile surface and elastic and non-elastic regions. At least one film strip that is elastic in the crosswise direction is introduced, as an elastic insert, between two material webs of fiber non-woven fabric having a web width greater than the width of the film strip. The segments of the material webs made of fiber non-woven fabric that are in direct contact next to the insert are connected, forming a non-elastic region of the laminate film. Subsequently, the laminate passes through an ultrasound bonding station, in which the elastic insert is melted by means of point-shaped bonds, while maintaining the substance of the fiber non-woven fabric, thereby connecting the elastic insert with the fiber non-woven fabric cover layers at discrete points and forming air-permeable structures.

7 Claims, 1 Drawing Sheet

U.S. PATENT DOCUMENTS

| | | |
|---|---|---|
| 6,818,083 B2 | 11/2004 | McAmish et al. |
| 2001/0041484 A1 | 11/2001 | Schwinn |
| 2002/0086602 A1 | 7/2002 | Friderich et al. |

FOREIGN PATENT DOCUMENTS

| | | |
|---|---|---|
| DE | 42 43 012 | 6/1994 |
| DE | 199 83 884 | 2/2002 |
| EP | 0 703 068 | 3/1996 |
| GB | 1 389 201 | 4/1975 |
| JP | 09-117982 | 5/1997 |
| WO | WO94/14607 | 7/1994 |
| WO | WO98/16380 | 4/1998 |
| WO | WO00/38918 | 7/2000 |
| WO | WO01/54900 | 8/2001 |

* cited by examiner

METHOD FOR PRODUCING AN AIR-PERMEABLE LAMINATE FILM WITH A TEXTILE SURFACE, WHICH HAS ELASTIC AND NON-ELASTIC REGIONS

CROSS REFERENCE TO RELATED APPLICATIONS

Applicants claim priority under 35 U.S.C. §119 of German Application No. 102 10 415.8 filed Mar. 9, 2002.

BACKGROUND OF THE INVENTION

1. Field of the Invention

The present invention relates to a method for producing an air-permeable laminate film. The film has a textile surface and elastic and non-elastic regions. Such laminate films are used, for example, in the fabrication of diaper panties, as elastic end cuffs, closure strips, and the like. They must be very elastic in predetermined regions. To improve the wearing comfort, they possess a textile surface and are air-permeable.

2. The Prior Art

In a method known from DE 42 38 541 A1, fiber non-woven fabric material webs are applied to an elastic carrier film, and connected with the carrier film in point form by means of ultrasound bonding. At the bonding sites, the carrier film is melted through, whereby the outside non-woven fabric webs are bonded into the partially melted material of the carrier film. This results in air-permeable regions, which are covered by a fine lattice structure obtained from the non-woven fabric filaments. The laminate is subsequently stretched in the take-off direction and relaxed again. A disadvantage is that the laminate film produced according to this known method stretches approximately uniformly over its entire length during use, and that the stretching is not concentrated on predetermined segments.

SUMMARY OF THE INVENTION

The object of the invention is to provide a method for the production of an air-permeable laminate film with a textile surface, which has elastic and non-elastic regions.

These and other objects are achieved by the method according to the invention. According to the method, at least one film strip that is elastic in the crosswise direction is introduced, as an elastic insert, between two material webs of fiber non-woven fabric. The web width is greater than the width of the film strip. The segments of the fiber non-woven fabric material webs that are in direct contact next to the insert are connected, forming a non-elastic region of the laminate film. Subsequently, the laminate passes through an ultrasound bonding station, in which the elastic insert is melted to form point-shaped bonds, while maintaining the substance of the fiber non-woven fabric. In this way, the elastic insert is connected with the cover layers of fiber non-woven fabric at discrete points and forms air-permeable structures.

According to the invention, several parallel strips arranged at a distance from one another can be introduced between the material webs made of fiber non-woven fabric. The cover layers made of fiber non-woven fabric are preferably glued to one another over their entire area in the non-elastic regions of the laminate film. Adhesives that can be used are, for example, hot-melt glues that can be sprayed onto the material web.

Preferably, in the ultrasound bonding station, the laminate is passed over a bonding roller with bonding spikes that project from the circumference. In this way, ultrasound vibrations are generated at the contact surfaces between the bonding spikes and the laminate. The ultrasound tool may be structured in the form of two rollers. One roller has a smooth circumferential surface and forms a counter-bearing for the bonding process. The other roller is structured as a bonding roller with bonding spikes that project from the circumference and represents the mating electrode or sonotrode of the tool.

Film strips made of a thermoplastic elastomer or multi-layered film strips produced by means of co-extrusion, with at least one layer made of a thermoplastic elastomer can be used as the elastic insert. When using a multi-layered film strip produced by means of co-extrusion, the material of the layers that come into contact with the fiber non-woven fabric can be established and optimized according to additional aspects. This results in advantages, for example improved control of the laminate adhesion between the elastic insert of the film and the outside fiber non-woven fabric. Furthermore, the resistance of the laminate film to ambient influences and to substances such as skin protection agents can be improved by means of suitably establishing the material.

In a further embodiment, the material webs made of fiber non-woven fabric are pre-stretched before the laminate is produced in order to improve the stretching capacity of the laminate film in the elastic regions. The material webs are pre-stretched crosswise to the running direction, at least in the segments that are connected with the elastic insert. During the pre-stretching in the crosswise direction, the fiber structure is loosened up and partially destroyed. This results in a structure that deforms in the pre-stretched direction, with little expenditure of force. Furthermore, the laminate leaving the ultrasound bonding station can be stretched crosswise to the take-off direction or subjected to incremental stretching in the elastic regions. Such mechanical activation of the laminate improves the stretching behavior of the laminate film.

BRIEF DESCRIPTION OF THE DRAWINGS

Other objects and features of the present invention will become apparent from the following detailed description considered in connection with the accompanying drawing. It should be understood, however, that the drawing is designed for the purpose of illustration only and not as a definition of the limits of the invention.

In the drawing.

DETAILED DESCRIPTION OF PREFERRED EMBODIMENTS

Figure 1:
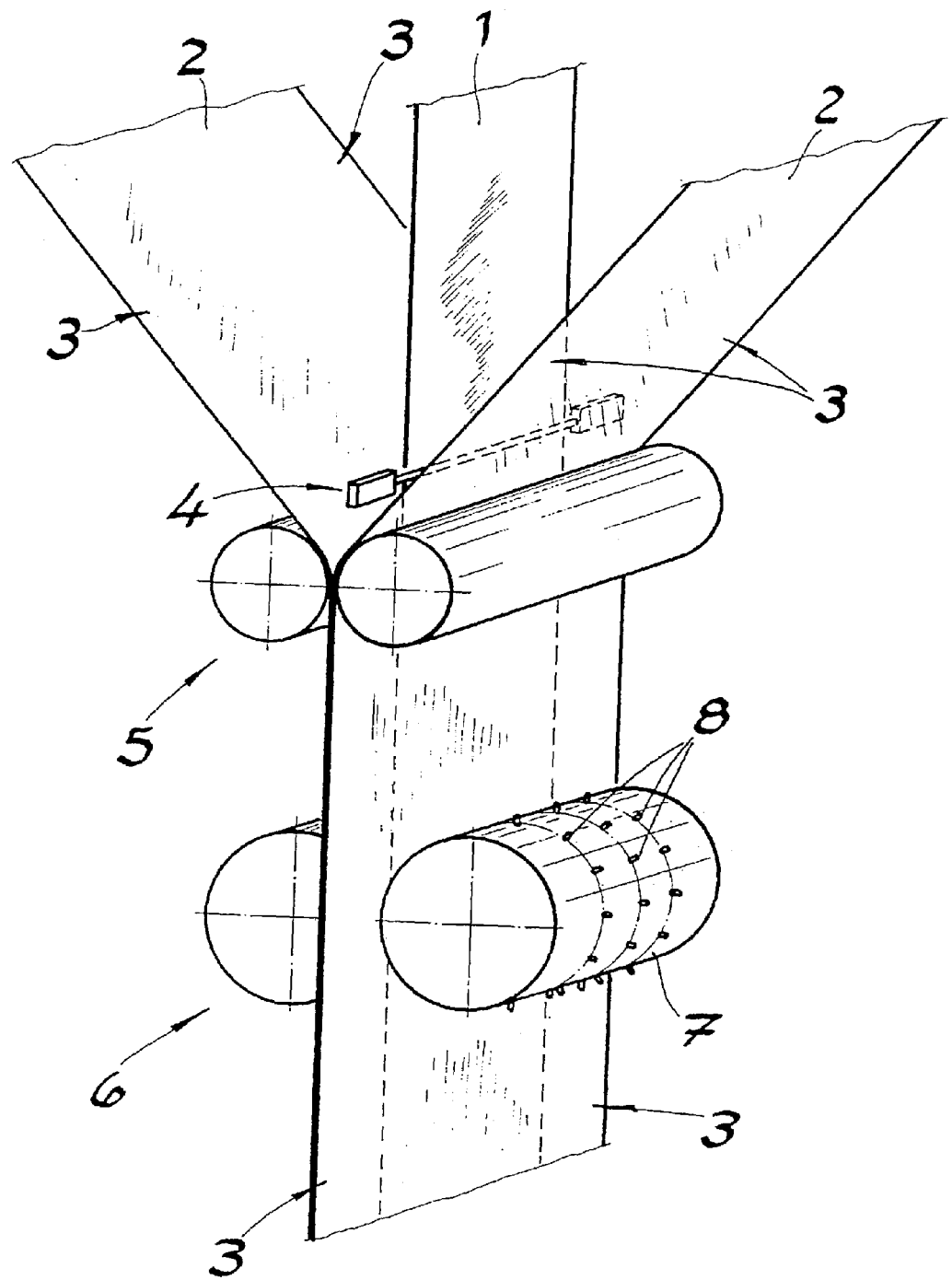
FIG. 1, the single figure, is a process schematic of the method according to an embodiment of the invention, for the production of an air-permeable laminate film with a textile surface, which has elastic and non-elastic regions.

In the method shown in the figure, at least one film strip 1 that is elastic in the crosswise direction is introduced, as an elastic insert, between two material webs, 2 made of fiber non-woven fabric. Material webs 2 have a web width greater than the width of film strip 1. The segments 3 of the material webs made of fiber non-woven fabric that are in direct contact next to the insert are connected, forming a non-elastic region of the laminate film, in each instance. In the exemplary embodiment, these segments 3 are glued together over their surface, whereby the adhesive is applied, in strips, to at least one of the material webs 2 that are to be glued to one another, using an application device 4, before the material webs run into a laminating unit 5. Subsequently, the laminate passes through an ultrasound bonding station 6, There, elastic insert 1 is melted or welded to form spot welds or point-shaped bonds, while maintaining the substance of the fiber non-woven fabric. Elastic insert 1 is thereby connected with the cover layers made of fiber non-woven fabric, at discrete points, forming air-permeable structures at the welded sites. A bonding roller 7, which has bonding spikes 8 that project from the circumference, is used to produce the point-shaped ultrasound bonds. The laminate is passed over the circumferential surface of roller 7, whereby ultrasound vibrations are generated at the contact surfaces between bonding spikes 8 and the laminate. For this purpose, bonding spikes 8 can be equipped with ultrasound heads. However, other types of devices with which point-shaped ultrasound bonds can be made in plastic films may be used.

In the method shown in the figure, a film strip 1 made of a thermoplastic elastomer is used as the elastic insert. A multi-layered film strip produced by means of co-extrusion, having at least one layer made of a thermoplastic elastomer, is also suitable for the method. The figure shows only one insert made of a thermoplastic elastomer. However, several parallel strips, at a distance from one another, may be introduced between the material webs made of fiber non-woven fabric. The arrangement and width of the elastic film strips is determined as a function of the use.

The laminate film produced according to the invention can subsequently be stretched directly, crosswise to the take-off direction, or subjected to incremental stretching in the elastic regions. For the mechanical subsequent treatment, known devices, which are not shown here, can be used.

EXAMPLE

A laminate made of elastic film strips and two material webs of polypropylene fiber non-woven fabric was produced on a laminating machine, according to the method described. The elastic film strips possessed a width of 50 mm and a thickness of 75 $\mu$m and consisted of a compound on the basis of styrene ethylene block copolymer (SEBS) with an addition of polyethylene copolymer. Several parallel elastic film strips, at a distance from one another, were passed to the laminating unit and introduced between the fiber non-woven fabric material webs. In the regions between the film strips, the fiber non-woven fabric webs were glued to one another, specifically using a polyurethane adhesive that was applied to the fiber non-woven fabric in a three-roller application unit. The laminate subsequently passed through an ultrasound bonding station, in which the regions in which the elastic film strips were present were bonded at certain points.

The bonding points were arranged in a uniform distribution, at intervals of approximately 5 mm, on a web width of 45 mm. This resulted in a laminate film that had textile properties due to the fiber non-woven fabric on the outside, was air-permeable, and contained strips of elastic material.

While only a few embodiments of the present invention have been shown and described, it is to be understood that many changes and modifications may be made thereunto without departing from the spirit and scope of the invention as defined in the appended claims.

What is claimed is:

1. A method for producing an air-permeable laminate film with a textile surface and elastic and non-elastic regions, comprising the steps of:
    (a) introducing as an elastic insert at least one film strip having a width and being elastic in a crosswise direction between two webs of non-woven material having a web width greater than the width of the film strip;
    (b) connecting segments of the webs of non-woven material in direct contact next to the insert with each other to form a laminate having non-elastic regions; and
    (c) subsequently passing the laminate through an ultrasound bonding station wherein the elastic insert is melted to form point-shaped bonds connecting the insert with the webs of non-woven material at discrete locations and form air-permeable structures without damaging the non-woven material.

2. The method according to claim 1, wherein several spaced-apart parallel film strips are introduced between the webs of non-woven material.

3. The method according to claim 1, wherein the webs of non-woven material are glued to one another over their entire area in the non-elastic regions of the laminate.

4. The method according to claim 1, wherein in the ultrasound bonding station, the laminate is passed over a bonding roller having projecting circumferential bonding spikes and ultrasound vibrations are generated at contact surfaces between the bonding spikes and the laminate.

5. The method according to claim 1, wherein the elastic insert comprises a film strip made of a thermoplastic elastomer or a multi-layered co-extruded film strip having at least one layer made of a thermoplastic elastomer.

6. The method according to claim 1, wherein the webs of non-woven material are pre-stretched, at least in the segments that are connected with the elastic insert, crosswise to the running direction, before the laminate is produced.

7. The method according to claim 1, wherein the laminate leaving the ultrasound bonding station is stretched directly to or crosswise with the take-off direction or is subjected to incremental stretching in the elastic regions.

* * * * *